(12) United States Patent
Kim et al.

(10) Patent No.: US 7,666,481 B2
(45) Date of Patent: Feb. 23, 2010

(54) LIQUID CRYSTAL COMPOSITION AND LIQUID CRYSTAL DISPLAY DEVICE HAVING THE SAME

(75) Inventors: Hyun-Wuk Kim, Asan-si (KR); Jong-Ho Son, Seoul (KR); Jang-Hyun Kim, Seoul (KR); Min-Goo Seok, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 11/932,387

(22) Filed: Oct. 31, 2007

(65) Prior Publication Data

US 2008/0117379 A1 May 22, 2008

(30) Foreign Application Priority Data

Nov. 21, 2006 (KR) .................. 10-2006-0115468

(51) Int. Cl.
*C09K 19/34* (2006.01)
*C09K 19/12* (2006.01)
*G02F 1/133* (2006.01)

(52) U.S. Cl. .............. 428/1.1; 252/299.63; 252/299.66; 349/182

(58) Field of Classification Search ............ 252/299.01, 252/299.63, 299.66; 428/1.1; 349/182
See application file for complete search history.

(56) References Cited

U.S. PATENT DOCUMENTS

| 6,514,580 B2 | 2/2003 | Heckmeier et al. |
| 6,764,722 B2 * | 7/2004 | Klasen et al. ................. 428/1.1 |
| 7,335,403 B2 * | 2/2008 | Klasen-Memmer et al. .. 428/1.1 |
| 7,351,453 B2 * | 4/2008 | Ichinose et al. .............. 428/1.1 |
| 2003/0090599 A1 * | 5/2003 | Ochiai et al. ................... 349/39 |
| 2003/0133066 A1 * | 7/2003 | Ono et al. .................... 349/141 |
| 2005/0280748 A1 * | 12/2005 | Ochiai et al. .................. 349/43 |
| 2006/0115606 A1 * | 6/2006 | Ichinose et al. .............. 428/1.1 |

FOREIGN PATENT DOCUMENTS

| JP | 8104869 | 4/1996 |
| KR | 1020060059192 | 6/2006 |

* cited by examiner

*Primary Examiner*—Shean C Wu
(74) *Attorney, Agent, or Firm*—H.C. Park & Associates, PLC

(57) ABSTRACT

A liquid crystal composition including 5 to 15% by weight of at least one compound of chemical formula 1, 25 to 40% by weight of at least one compound of chemical formula 2, 10 to 25% by weight of at least one compound of chemical formula 3, 20 to 30% by weight of at least one compound of chemical formula 4, 15 to 25% by weight of at least one compound of chemical formula 5, 0 to 10% by weight of at least one compound of chemical formula 6, 0 to 10% by weight of at least one compound of chemical formula 7, and 0 to 10% by weight of at least one compound of chemical formula 8.

11 Claims, 3 Drawing Sheets

LIQUID CRYSTAL COMPOSITION AND LIQUID CRYSTAL DISPLAY DEVICE HAVING THE SAME

CROSS-REFERENCE TO RELATED APPLICATION

This application claims priority from and the benefit of Korean Patent Application No. 10-2006-0115468, filed on Nov. 21, 2006, which is hereby incorporated by reference for all purposes as if fully set forth herein.

BACKGROUND OF THE INVENTION

1. Field of the Invention

The present invention relates to a liquid crystal composition and a liquid crystal display device having the same.

2. Discussion of the Background

Recently, liquid crystal display devices have been employed in large-screen televisions. While the viewing angles, color realization, and brightness of liquid crystal display devices have dramatically improved, the response time is not satisfactory.

A patterned vertically aligned (PVA) mode liquid crystal display, which has a cutting pattern formed in a pixel electrode and a common electrode, has an enhanced viewing angle. The orientation of liquid crystal molecules is adjusted by a fringe field formed by the cutting pattern, thereby improving the viewing angle.

The fringe field becomes weak in a center area of a domain defined by neighboring cutting patterns. The movement of the liquid crystal molecules is delayed in the center area where the fringe field is weak, thereby slowing the response time.

The delayed movement of the liquid crystal molecules restricts the size of the pixel electrode and as such, does not substantially increase the aperture ratio.

SUMMARY OF THE INVENTION

The present invention provides a liquid crystal composition that may improve a response time, and a liquid crystal display device having the same.

Additional features of the present invention will be set forth in the description which follows and, in part will be obvious from the description, or may be learned by practice of the present invention.

The present invention discloses a liquid crystal composition including 5 to 15% by weight of at least one compound of a following chemical formula 1, 25 to 40% by weight of at least one compound of a following chemical formula 2, 10 to 25% by weight of at least one compound of a following chemical formula 3, 20 to 30% by weight of at least one compound of a following chemical formula 4, 15 to 25% by weight of at least one compound of a following chemical formula 5, 0 to 10% by weight of at least one compound of a following chemical formula 6, 0 to 10% by weight of at least one compound of a following chemical formula 7, and 0 to 10% by weight of at least one compound of a following chemical formula 8.

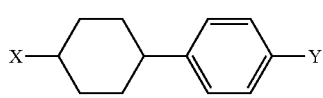

Chemical formula 1

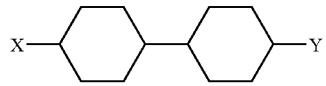

Chemical formula 2

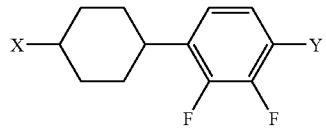

Chemical formula 3

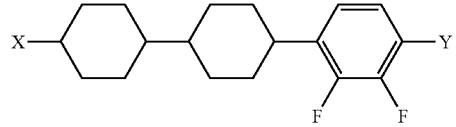

Chemical formula 4

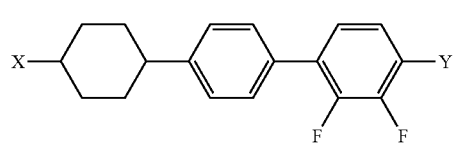

Chemical formula 5

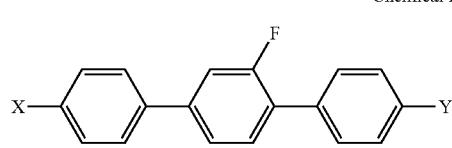

Chemical formula 6

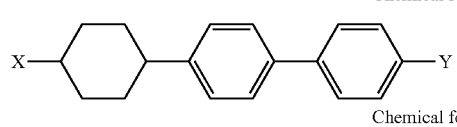

Chemical formula 7

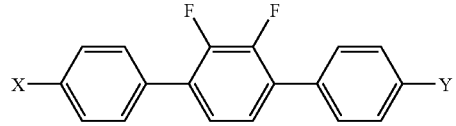

Chemical formula 8 where X and Y are each R1 or OR2, and R1 and R2 are each an alkyl group or alkenyl group having 1 to 5 carbons.

The present invention also discloses a liquid crystal display device including a first substrate, a second substrate, and a liquid crystal composition. The first substrate includes a thin film transistor and a pixel electrode connected to the thin film transistor. The second substrate faces the first substrate and includes a common electrode. The liquid crystal composition is disposed between the first substrate and the second substrate and includes a liquid crystal composition including 5 to 15% by weight of at least one compound of chemical formula 1, 25 to 40% by weight of at least one compound of chemical formula 2, 10 to 25% by weight of at least one compound of chemical formula 3, 20 to 30% by weight of at least one compound of chemical formula 4, 15 to 25% by weight of at least one compound of chemical formula 5, 0 to 10% by weight of at least one compound of chemical formula 6, 0 to 10% by weight of at least one compound of chemical formula 7, and 0 to 10% by weight of at least one compound of chemical formula 8.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
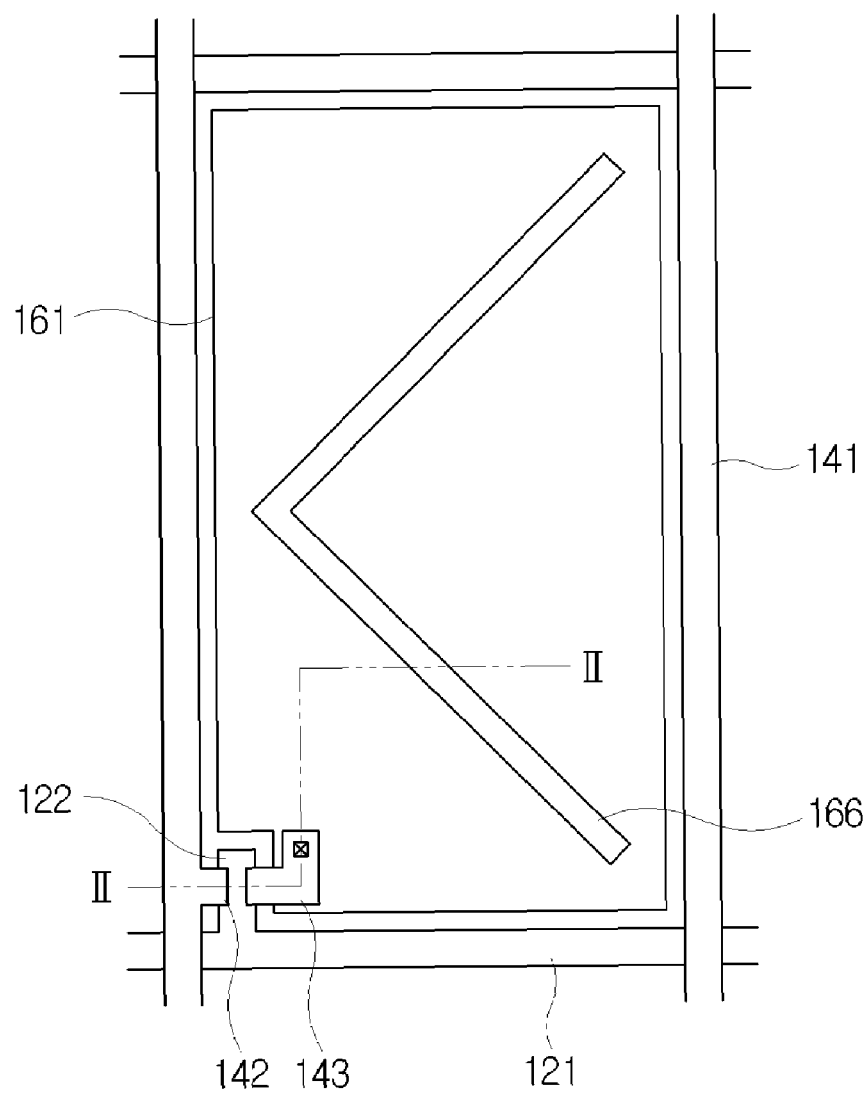
FIG. 1 shows a first substrate of a liquid crystal display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
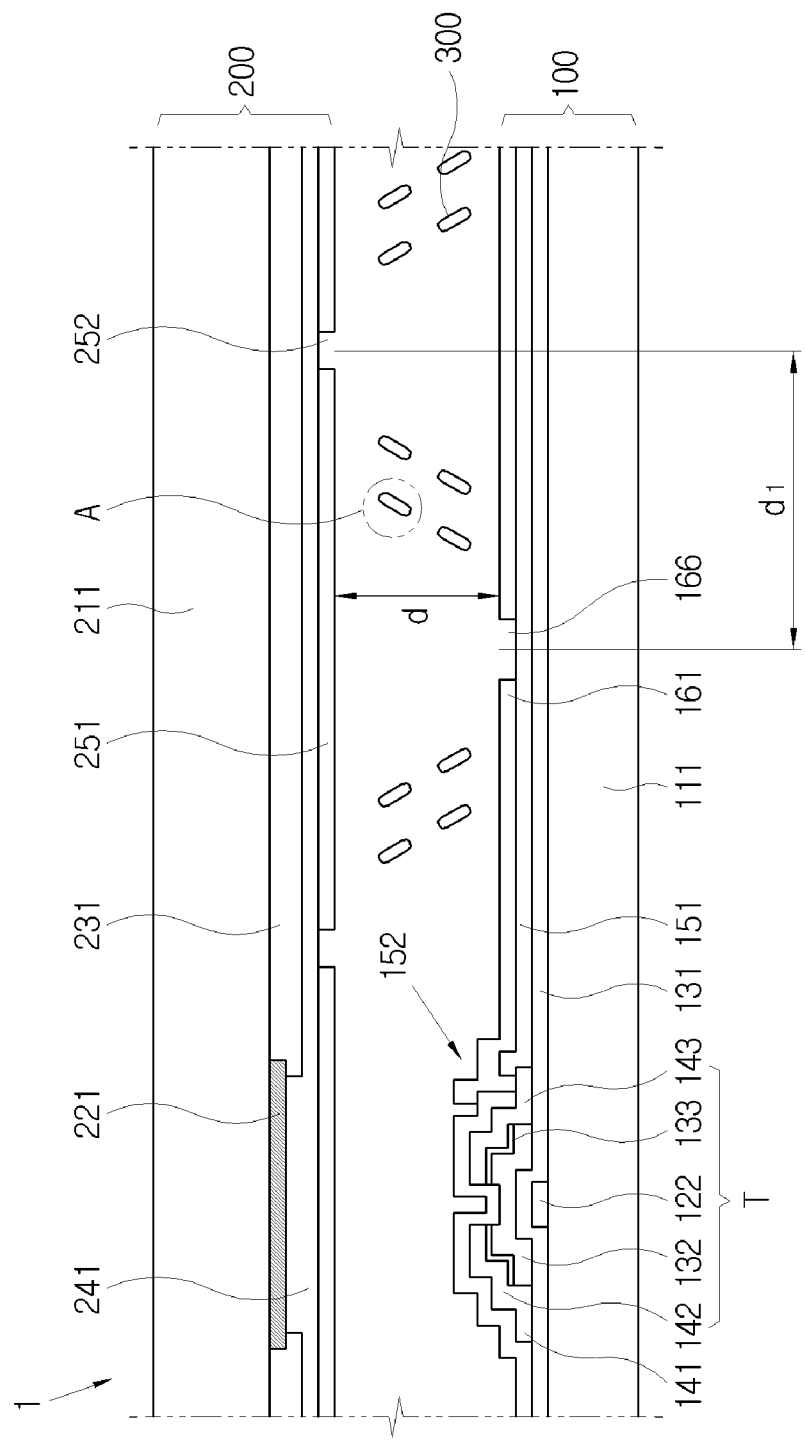
FIG. 2 is a sectional view, taken along line II-II in FIG. 1.

A liquid crystal display device according to exemplary embodiments of the present invention will be described with reference to FIG. 1 and FIG. 2.

A liquid crystal display device 1 includes a first substrate 100 having a thin film transistor T, a second substrate 200 facing the first substrate 100, and a liquid crystal layer 300 interposed between the first and second substrates 100 and 200.

Hereinafter, the first substrate 100 will be described.

Gate wires 121 and 122 are formed on a first insulating substrate 111. The gate wires 121 and 122 may include a single metal layer or multiple layers. The gate wires 121 and 122 include a gate line 121 that is disposed in a display region and extends transversely and a gate electrode 122 that is connected to the gate line 121.

A gate insulating layer 131 including silicon nitride ($SiN_x$) covers the gate wires 121 and 122 on the first insulating substrate 111.

A semiconductor layer 132 including amorphous silicon is formed on the gate insulating layer 131 of the gate electrode 122. An ohmic contact layer 133 including silicide or n+ hydrogenated amorphous silicon highly doped with an n-type dopant is formed on the semiconductor layer 132. The ohmic contact layer 133 is removed from a channel between a source electrode 142 and a drain electrode 143.

Data wires 141, 142, and 143 are formed on the ohmic contact layer 133 and the gate insulating layer 131. The data wires 141, 142, and 143 may include a single metal layer or multiple layers. The data wires 141, 142, and 143 include a data line 141 that is formed substantially perpendicular to the gate line 121 and crosses the gate line 121 to form a pixel, a source electrode 142 that is branched from the data line 141 on the ohmic contact layer 133, and a drain electrode 143 that is spaced apart from the source electrode 142 on the ohmic contact layer 133 opposite the source electrode 142.

A passivation layer 151 is formed on the data wires 141, 142, and 143 and the portion of the semiconductor layer 132 that is not covered by the data wires 141, 142, and 143. A contact hole 152 is formed in the passivation layer 151 to expose the drain electrode 143 therethrough.

A pixel electrode 161 is formed on the passivation layer 151. The pixel electrode 161 may include a transparent conductive material, such as indium tin oxide (ITO), indium zinc oxide (IZO), etc. The pixel electrode 161 is connected to the drain electrode 143 through the contact hole 152. A pixel electrode cutting pattern 166 is formed in the pixel electrode 161.

The pixel electrode cutting pattern 166 of the pixel electrode 161, together with a common electrode cutting pattern 252 (to be described later), divides the liquid crystal layer 300 into a plurality of domains.

Hereinafter, the second substrate 200 will be described.

A black matrix 221 is formed on a second insulating substrate 211. The black matrix 221 blocks light from being directly emitted to the thin film transistor T of the first substrate 100. The black matrix 221 includes a photoresist organic material and a black pigment. The black pigment may include carbon black or titanium oxide.

A color filter 231 includes red, green, and blue filters that are repeatedly formed between the black matrixes 221. The color filter 231 assigns color to light that is emitted from a backlight unit (not shown) and travels through the liquid crystal layer 300. The color filter 231 may include a photoresist organic material.

An overcoat layer 241 is formed on the color filter 231 and the portions of the black matrix 221 that are not covered by the color filter 231. The overcoat layer 241 provides a planar surface and protects the color filter 231. The overcoat layer 241 may include a photoresist acrylic resin.

A common electrode 251 is formed on the overcoat layer 241. The common electrode 251 includes a transparent conductive material such as ITO, IZO, etc. The common electrode 251, together with the pixel electrode 161 of the first substrate 100, supplies a voltage to the liquid crystal layer 300.

The common electrode cutting pattern 252 is formed in the common electrode 251. The common electrode cutting pattern 252, together with the pixel electrode cutting pattern 166 of the pixel electrode 161, divides the liquid crystal layer 300 into a plurality of domains.

The pixel electrode cutting pattern 166 and the common electrode cutting pattern 252 are not limited to those in the exemplary embodiment. For example, the pixel electrode cutting pattern 166 and the common electrode cutting pattern 252 may be formed in various shapes. Further, the pixel electrode 161 may be divided into a plurality of parts which are spaced apart from each other, and the respective parts may receive electrical signals that are different from each other.

The liquid crystal layer 300 is disposed between the first and second substrates 100 and 200. The liquid crystal layer 300 has a vertically aligned (VA) mode, in which the lengthwise direction of the liquid crystal molecules is perpendicular to the first and second substrates 100 and 200 when a voltage is not being received. When receiving a voltage, the liquid crystal molecules are oriented with respect to the resulting electric field due to negative dielectric anisotropy.

If the cutting patterns 166 and 252 are not formed, the liquid crystal molecules may be irregularly arranged since the angle of orientation is not determined, thereby creating a disclination line at a boundary between regions of liquid crystal molecules having different orientations. The cutting patterns 166 and 252 form a fringe field when a voltage is supplied to the liquid crystal layer 300 and determine the orientations of the liquid crystal molecules. The liquid crystal layer 300 is divided into a plurality of domains according to the arrangement of the cutting patterns 166 and 252.

A width d1 (refer to FIG. 2) of one of the domains is determined by an interval between the cutting patterns 166 and 252. A fringe field may become weak or is not active in a center area A of the respective domains. The portion of the liquid crystal layer 300 disposed in the center area of the respective domains moves in response to the movement of neighboring regions of the liquid crystal layer 300, thereby slowing a response time. If the interval between the cutting patterns 166 and 252 is reduced to improve the response time, brightness may decrease.

In the liquid crystal layer 300 according to exemplary embodiments of the present invention, the response time may improve while the width of the domains is maintained. Alternatively, the width of the domains may be increased while the response time of the liquid crystal layer 300 is improved, thereby increasing the aperture ratio.

The liquid crystal layer 300 according to exemplary embodiments of the present invention includes the following liquid crystal compositions and may further include additives such as dyes, UV stabilizers, and/or antioxidants.

The liquid crystal compositions are as follows. The percentage (%) refers to a weight %.

At least one compound 1 of a chemical formula 1 in an amount of 5 to 15%.

At least one compound 2 of a chemical formula 2 in an amount of 25 to 40%.

At least one compound 3 of a chemical formula 3 in an amount of 10 to 25%.

At least one compound 4 of a chemical formula 4 in an amount of 20 to 30%.

At least one compound 5 of a chemical formula 5 in an amount of 15 to 25%.

At least one compound 6 of a chemical formula 6 in an amount of 0 to 10%.

At least one compound 7 of a chemical formula 7 in an amount of 0 to 10%.

At least one compound 8 of chemical formula 8 in an amount of 0 to 10%.

In the chemical formulas, X and Y are each R1 or OR2. R1 and R2 are each an alkyl group or alkenyl group having 1 to 5 carbons.

For example, X and Y may be materials such as $CH_3$, $C_2H_5$, $C_3H_7$, $C_4H_9$, $C_5H_{11}$, $OCH_3$, $OC_2H_5$, $OC_3H_7$, $OC_4H_9$, and $OC_5H_{11}$ that do not include a carbon-carbon double bond, or materials such as $C_2H_4$, $C_3H_6$, $C_4H_8$, $C_5H_{11}$, $OC_2H_4$, $OC_3H_6$, $OC_4H_8$, and $OC_5H_{10}$ that include a carbon-carbon double bond. Additionally, X and Y may include two or more carbon-carbon double bonds.

The compound whose X and/or Y include a carbon-carbon double bond may make up 5% or less of the liquid crystal composition. If 5% or more is included, an image sticking may be created.

The compounds 3, 4, 5, and 8 including di-fluoro benzene assign negative permittivity to the liquid crystal composition.

The liquid crystal composition has a dielectric anisotropy (Δε) of −2.7 to −5.8, an optical anisotropy (Δn) of 0.075 to 0.109, and a rotational viscosity (γ1) 87 mPa·s to 165 mPa·s.

An experiment was conducted to measure the properties and response times of various liquid crystal compositions.

Five liquid crystal compositions were tested in the experiment. These compositions include exemplary embodiments 1, 2, 3, and 4 and a comparative embodiment. The compositions of the exemplary embodiments 1, 2, 3, and 4 are shown in Table 1.

TABLE 1

|  | Exemplary Embodiment 1 | Exemplary Embodiment 2 | Exemplary Embodiment 3 | Exemplary Embodiment 4 |
| --- | --- | --- | --- | --- |
| Compound 1 | 10 | 6 | 7 | 6 |
| Compound 2 | 30 | 31 | 32 | 33 |
| Compound 3 | 14 | 18 | 16 | 18 |
| Compound 4 | 26 | 23 | 25 | 23 |
| Compound 5 | 20 | 18 | 18 | 18 |
| Compound 6 | 0 | 0 | 2 | 0 |
| Compound 7 | 0 | 4 | 0 | 0 |
| Compound 8 | 0 | 0 | 0 | 2 |

Unit: %

The comparative embodiment includes following compounds:

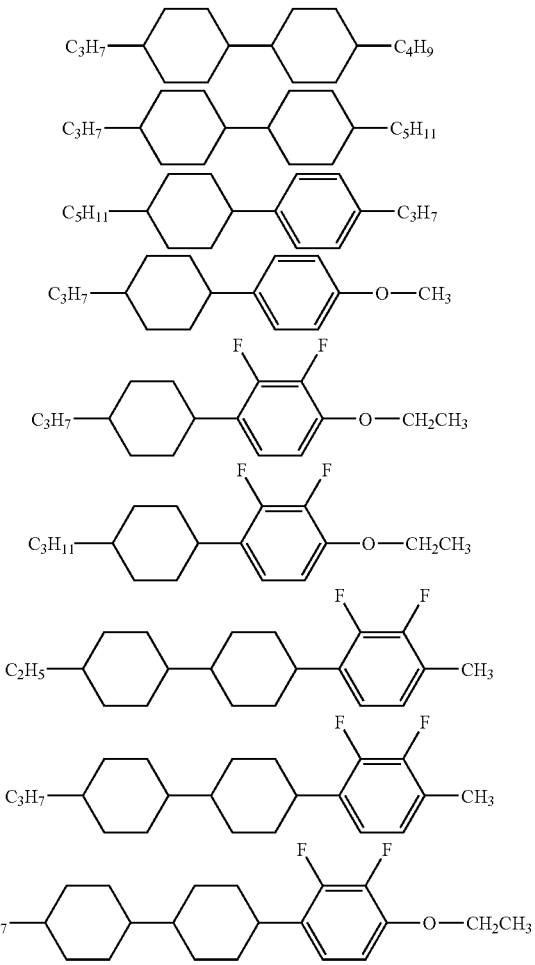

-continued

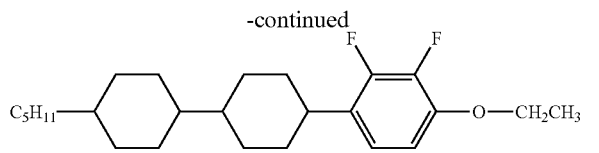

The property of the liquid crystal composition according to the exemplary embodiments and comparative embodiment are shown in Table 2.

TABLE 2

|  | Comparative Embodiment | Exemplary Embodiment 1 | Exemplary Embodiment 2 | Exemplary Embodiment 3 | Exemplary Embodiment 4 |
|---|---|---|---|---|---|
| Phase transition temperature (Tni, ° C.) | 70 | 80 | 79 | 78.5 | 78 |
| Δn | 0.0822 | 0.0901 | 0.0917 | 0.0910 | 0.0900 |
| Δε | −3.8 | −3.3 | −3.3 | −3.3 | −3.3 |
| γ1 (mPa·s) | 133 | 127 | 133 | 131 | 130 |

The response time is measured while adjusting the cell gap d (refer to FIG. 2) to 3.5 μm to 4 μm. The product of Δn and d (where Δn is optical anisotropy, and d is cell gap) is adjusted to have same value regardless of the cell gap d.

The rising time of the liquid crystal is measured for the response time.

The response time $T_r$ of the liquid crystal is determined by adding the rising time $T_{on}$ to the falling time $T_{off}$. In a normally black mode, the rising time is defined as the time in which 10% transmittivity rises to 90% transmittivity. The falling time is defined as the time in which 90% transmittivity falls to 10% transmittivity. The falling time is roughly 6 ms regardless of the composition of the liquid crystal while the rising time is greatly influenced by the composition of the liquid crystal. If the response time of the liquid crystal becomes slow, motion blurring may occur, thereby lowering display quality.

Figure 3:
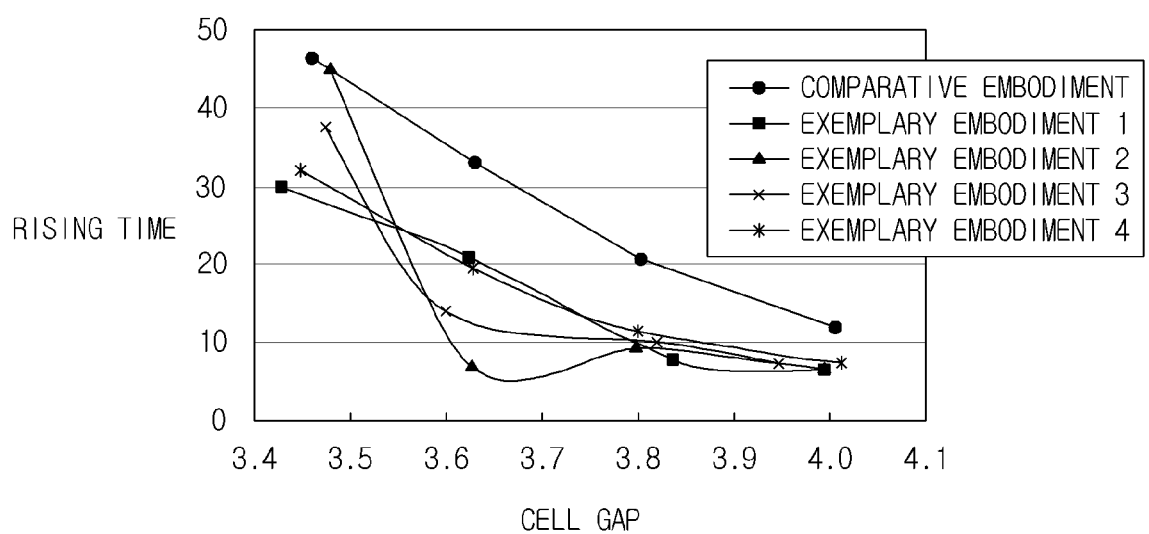
FIG. 3 is a graph which shows estimated response times of liquid crystal compositions according to exemplary embodiments of the present invention.

As shown in FIG. 3, exemplary embodiments 1, 2, 3, and 4 show shorter rising times than the comparative embodiment regardless of the cell gap.

Accordingly, the employment of the liquid crystal composition in the exemplary embodiments may improve the response time and/or aperture ratio.

As described above, the present invention provides a liquid crystal composition which may improve response time, and a liquid crystal display device having the same.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal composition, comprising:
   5 to 15% by weight of at least one compound of a following chemical formula 1;
   25 to 40% by weight of at least one compound of a following chemical formula 2;
   10 to 25% by weight of at least one compound of a following chemical formula 3;
   20 to 30% by weight of at least one compound of a following chemical formula 4;
   15 to 25% by weight of at least one compound of a following chemical formula 5;
   at least one compound selected from a group consisting of 0.1 to 10% by weight of at least one compound of a following chemical formula 6
   and 0.1 to 10% by weight of at least one compound of a following chemical formula 7; and
   0 to 10% by weight of at least one compound of a following chemical formula 8,

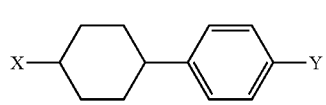

Chemical formula 1

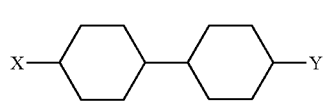

Chemical formula 2

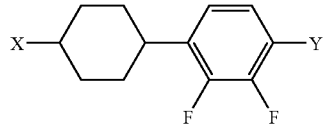

Chemical formula 3

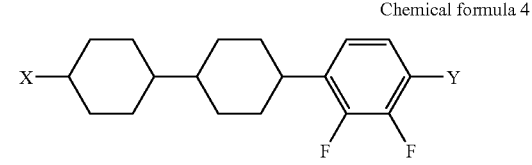

Chemical formula 4

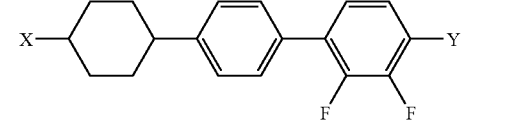

Chemical formula 5

Chemical formula 6

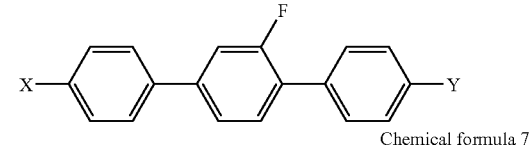

Chemical formula 7

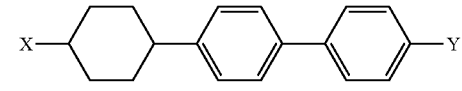

-continued

Chemical formula 8

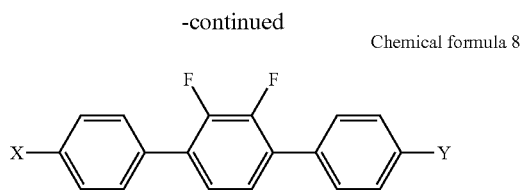

wherein X and Y are each R1 or OR2, and R1 and R2 are each an alkyl group having 1 to 5 carbons or alkenyl group having 2 to 5 carbons.

2. The liquid crystal composition of claim 1, wherein the compound in which at least one of X and Y comprises the alkenyl group is 5% by weight or less of the liquid crystal composition.

3. The liquid crystal composition of claim 1, wherein a dielectric anisotropy of the liquid crystal composition is −2.7 to −5.8.

4. The liquid crystal composition of claim 1, wherein an optical anisotropy of the liquid crystal composition is 0.075 to 0.109.

5. The liquid crystal composition of claim 1, wherein a rotational viscosity of the liquid crystal composition is 87 mPa·s to 165 mPa·s.

6. A liquid crystal display device, comprising:
a first substrate comprising a thin film transistor and a pixel electrode connected to the thin film transistor;
a second substrate facing the first substrate and comprising a common electrode; and
a liquid crystal composition disposed between the first substrate and the second substrate, the liquid crystal composition comprising:
5 to 15% by weight of at least one compound of a following chemical formula 1;
25 to 40% by weight of at least one compound of a following chemical formula 2;
10 to 25% by weight of at least one compound of a following chemical formula 3;
20 to 30% by weight of at least one compound of a following chemical formula 4;
15 to 25% by weight of at least one compound of a following chemical formula 5;
at least one compound selected from a group consisting of 0.1 to 10% by weight of at least one compound of a following chemical formula 6
and 0.1 to 10% by weight of at least one compound of a following chemical formula 7; and
0 to 10% by weight of at least one compound of a following chemical formula 8, Chemical formula 1

Chemical formula 2

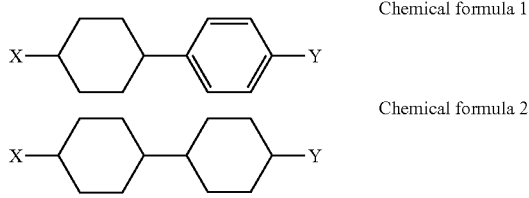

-continued

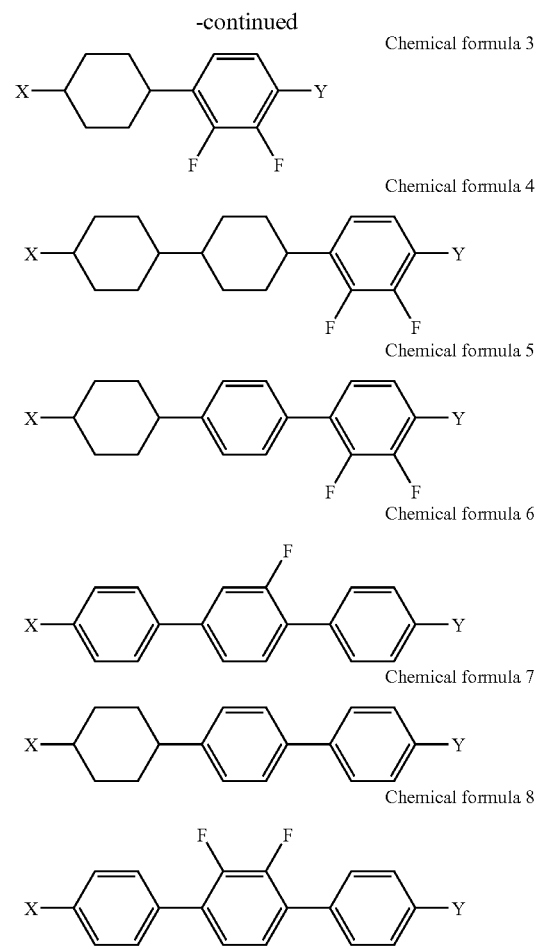

Chemical formula 3

Chemical formula 4

Chemical formula 5

Chemical formula 6

Chemical formula 7

Chemical formula 8 wherein X and Y are each R1 or OR2, and R1 and R2 are each an alkyl group having 1 to 5 carbons or alkenyl group having 2 to 5 carbons.

7. The liquid crystal display device of claim 6, wherein the compound in which at least one of X and Y comprises the alkenyl group is 5% by weight or less of the liquid crystal composition.

8. The liquid crystal display device of claim 6, wherein a dielectric anisotropy of the liquid crystal composition is −2.7 to −5.8.

9. The liquid crystal display device of claim 6, wherein an optical anisotropy of the liquid crystal composition is 0.075 to 0.109.

10. The liquid crystal display device of claim 6, wherein a rotational viscosity of the liquid crystal composition is 87 mPa·s to 165 mPa·s.

11. The liquid crystal display device of claim 6, wherein the pixel electrode comprises a pixel electrode cutting pattern, and the common electrode comprises a common electrode cutting pattern.

* * * * *